United States Patent
Fisher et al.

(10) Patent No.: US 7,762,931 B2
(45) Date of Patent: Jul. 27, 2010

(54) SEAT FOR CARDIO-FITNESS EQUIPMENT

(75) Inventors: John Fisher, Los Gatos, CA (US); Steve Anderes, Cupertino, CA (US); Joel Jensen, Redwood City, CA (US)

(73) Assignee: Interactive Fitness Holdings, LLC, Sunnyvale, CA (US)

( * ) Notice: Subject to any disclaimer, the term of this patent is extended or adjusted under 35 U.S.C. 154(b) by 0 days.

(21) Appl. No.: 11/788,368

(22) Filed: Apr. 18, 2007

(65) Prior Publication Data
US 2008/0261774 A1    Oct. 23, 2008

(51) Int. Cl.
*A63B 22/06* (2006.01)
(52) U.S. Cl. .................. 482/57; 482/5; 297/215.14
(58) Field of Classification Search ............ 482/4–7, 482/51, 57, 1, 2, 3, 8, 9, 52, 53, 58, 59, 60, 482/61, 62, 63, 64, 65; 297/215.13, 215.24, 297/344.11, 208, 41.37, 383; 403/109.1, 403/109.3, 109.6, 374.5
See application file for complete search history.

(56) References Cited

U.S. PATENT DOCUMENTS

| | | | |
|---|---|---|---|
| 2,278,101 A * | 3/1942 | Browne | 248/430 |
| 4,084,810 A * | 4/1978 | Forsman | 482/5 |
| 4,150,851 A * | 4/1979 | Cienfuegos | 297/215.13 |
| 4,512,567 A | 4/1985 | Phillips | |
| 4,613,129 A | 9/1986 | Schroeder et al. | |
| 4,674,741 A | 6/1987 | Pasierb, Jr. et al. | |
| 4,709,917 A | 12/1987 | Yang et al. | |
| 4,772,069 A * | 9/1988 | Szymski | 297/215.14 |
| 4,817,938 A | 4/1989 | Nakao et al. | |
| 4,822,032 A | 4/1989 | Whitmore et al. | |
| 4,919,378 A * | 4/1990 | Iwasaki et al. | 248/295.11 |
| 4,934,692 A | 6/1990 | Owens | |
| 4,984,986 A | 1/1991 | Vohnout | |
| 5,007,675 A * | 4/1991 | Musto et al. | 297/215.14 |
| 5,029,846 A | 7/1991 | Hao et al. | |
| 5,044,592 A * | 9/1991 | Cienfuegos | 248/408 |
| 5,050,865 A | 9/1991 | Augspurger et al. | |
| 5,104,120 A | 4/1992 | Watterson et al. | |
| 5,149,084 A | 9/1992 | Dalebout et al. | |
| 5,165,278 A | 11/1992 | Huszczuk et al. | |
| 5,213,555 A | 5/1993 | Hood et al. | |

(Continued)

FOREIGN PATENT DOCUMENTS

EP    1518588    3/2005

(Continued)

OTHER PUBLICATIONS

Internatiuonal Search Report, PCT/US07/015018, (May 12, 2008).

(Continued)

*Primary Examiner*—Loan H Thanh
*Assistant Examiner*—Daniel F Roland
(74) *Attorney, Agent, or Firm*—Perkins Coie LLP

(57) ABSTRACT

One embodiment of the present invention discloses a cardio-fitness equipment with a seat that features height adjustment, proximity to handlebars adjustment, and easy removal of the seat for the purpose of exchange with a different user-selected model or for cleaning.

20 Claims, 9 Drawing Sheets

U.S. PATENT DOCUMENTS

| | | | |
|---|---|---|---|
| 5,240,417 A * | 8/1993 | Smithson et al. | 434/61 |
| 5,256,115 A | 10/1993 | Scholder et al. | |
| 5,267,925 A | 12/1993 | Boyd | |
| 5,310,392 A * | 5/1994 | Lo | 482/63 |
| 5,356,356 A * | 10/1994 | Hildebrandt et al. | 482/62 |
| 5,403,252 A | 4/1995 | Leon et al. | |
| 5,433,552 A * | 7/1995 | Thyu | 403/378 |
| 5,441,327 A * | 8/1995 | Sanderson | 297/195.1 |
| 5,466,200 A | 11/1995 | Ulrich et al. | |
| 5,489,249 A * | 2/1996 | Brewer et al. | 482/5 |
| 5,492,513 A * | 2/1996 | Wang | 482/4 |
| 5,513,895 A * | 5/1996 | Olson et al. | 297/215.14 |
| 5,547,439 A * | 8/1996 | Rawls et al. | 482/5 |
| 5,569,120 A | 10/1996 | Anjanappa et al. | |
| 5,645,509 A | 7/1997 | Brewer et al. | |
| 5,690,582 A | 11/1997 | Ulrich et al. | |
| 5,752,879 A | 5/1998 | Berdut | |
| 5,785,630 A | 7/1998 | Bobick et al. | |
| 5,888,172 A * | 3/1999 | Andrus et al. | 482/7 |
| 5,890,995 A | 4/1999 | Bobick et al. | |
| 6,059,692 A | 5/2000 | Hickman | |
| 6,152,856 A * | 11/2000 | Studor et al. | 482/8 |
| 6,193,631 B1 | 2/2001 | Hickman | |
| 6,283,896 B1 | 9/2001 | Grunfeld et al. | |
| 6,312,363 B1 | 11/2001 | Watterson et al. | |
| 6,419,613 B2 * | 7/2002 | Stearns et al. | 482/57 |
| 6,447,424 B1 | 9/2002 | Ashby et al. | |
| 6,458,060 B1 | 10/2002 | Watterson et al. | |
| 6,464,618 B1 * | 10/2002 | Shea | 482/8 |
| 6,475,115 B1 * | 11/2002 | Candito et al. | 482/4 |
| 6,511,402 B2 | 1/2003 | Shu et al. | |
| 6,513,395 B1 | 2/2003 | Jones | |
| 6,530,864 B1 * | 3/2003 | Parks | 482/4 |
| 6,626,799 B2 | 9/2003 | Watterson et al. | |
| 6,648,802 B2 * | 11/2003 | Ware | 482/57 |
| 6,659,560 B1 * | 12/2003 | Chi | 297/383 |
| 6,669,603 B1 * | 12/2003 | Forcillo | 482/57 |
| 6,749,537 B1 | 6/2004 | Hickman | |
| 6,752,453 B1 * | 6/2004 | Yapp | 297/215.14 |
| 6,765,726 B2 | 7/2004 | French et al. | |
| 6,786,848 B2 | 9/2004 | Yamashita et al. | |
| 6,808,472 B1 | 10/2004 | Hickman | |
| 6,902,513 B1 * | 6/2005 | McClure | 482/8 |
| 6,918,858 B2 | 7/2005 | Watterson et al. | |
| 6,921,351 B1 * | 7/2005 | Hickman et al. | 482/8 |
| 6,942,290 B1 * | 9/2005 | Gootter et al. | 297/195.1 |
| 6,988,739 B2 | 1/2006 | Guderzo et al. | |
| 6,997,852 B2 | 2/2006 | Watterson et al. | |
| 7,060,006 B1 | 6/2006 | Watterson et al. | |
| 7,060,008 B2 | 6/2006 | Watterson et al. | |
| 7,066,868 B2 | 6/2006 | Van Den Heever | |
| 7,144,029 B1 * | 12/2006 | Heady | 280/288.4 |
| 7,166,062 B1 | 1/2007 | Watterson et al. | |
| 7,166,064 B2 | 1/2007 | Watterson et al. | |
| 7,172,532 B2 * | 2/2007 | Baker | 482/57 |
| 7,226,393 B2 * | 6/2007 | Baker | 482/57 |
| 7,264,577 B2 | 9/2007 | Lin | |
| 7,311,640 B2 * | 12/2007 | Baatz | 482/4 |
| 7,364,533 B2 * | 4/2008 | Baker | 482/57 |
| 2001/0008348 A1 * | 7/2001 | Nelson | 297/195.1 |
| 2001/0019985 A1 * | 9/2001 | Reck | 482/5 |
| 2002/0055422 A1 | 5/2002 | Airmet et al. | |
| 2003/0134714 A1 * | 7/2003 | Oishi et al. | 482/6 |
| 2003/0196497 A1 | 10/2003 | Geilenbrugge | |
| 2003/0207734 A1 * | 11/2003 | La Stayo et al. | 482/1 |
| 2004/0127335 A1 | 7/2004 | Watterson et al. | |
| 2004/0171464 A1 | 9/2004 | Ashby et al. | |
| 2004/0204298 A1 * | 10/2004 | Chen | 482/57 |
| 2004/0208687 A1 * | 10/2004 | Sicz et al. | 403/109.3 |
| 2005/0093348 A1 * | 5/2005 | Heady | 297/195.1 |
| 2005/0221960 A1 | 10/2005 | Miyamaru et al. | |
| 2005/0233861 A1 | 10/2005 | Hickman et al. | |
| 2006/0003872 A1 | 1/2006 | Chiles et al. | |
| 2006/0063644 A1 * | 3/2006 | Yang | 482/4 |
| 2006/0166792 A1 * | 7/2006 | Kuo | 482/57 |
| 2006/0172866 A1 * | 8/2006 | Kuo | 482/57 |
| 2007/0203000 A1 | 8/2007 | Chiu | |
| 2007/0225120 A1 * | 9/2007 | Schenk | 482/4 |
| 2008/0015088 A1 * | 1/2008 | Del Monaco | 482/4 |
| 2008/0020898 A1 * | 1/2008 | Pyles et al. | 482/4 |
| 2008/0096725 A1 | 4/2008 | Keiser | |
| 2008/0103030 A1 | 5/2008 | Watson et al. | |

FOREIGN PATENT DOCUMENTS

| | | |
|---|---|---|
| FR | 2591680 | 6/1987 |
| KR | 20030016939 | 3/2003 |

OTHER PUBLICATIONS

Wilson, David Gordon, "Bicycling Science" third edition; the MIT Press, 2004 Massachusetts Institute of Technology—entire book.

International Search Report, PCT/US2008/079398, dated Dec. 11, 2008.

CompuTrainer User's Guide Control Module, published 1987-1991, 1-2 pages.

Racermate, "CompuTrainer Pro NES Version", www.computrainer.com., Computerized Training System Model 8001, Operating Manual 1997, pp. 1-32.

International Search Report, PCT/US07/015018, Published Jan. 3, 2008; WIPO Publication No. WO 2008/002644.

CompuTrainer User's Guide Control Module, published 1987-1991, pp. 1-2.

Racemate, "CompuTrainer Pro NES Version", www.computrainer.com., Computerized Training System Model 8001, Operating manual, 1997, pp. 1-32.

Japanese publication No. JP63212177, Abstract only, English Translation.

* cited by examiner

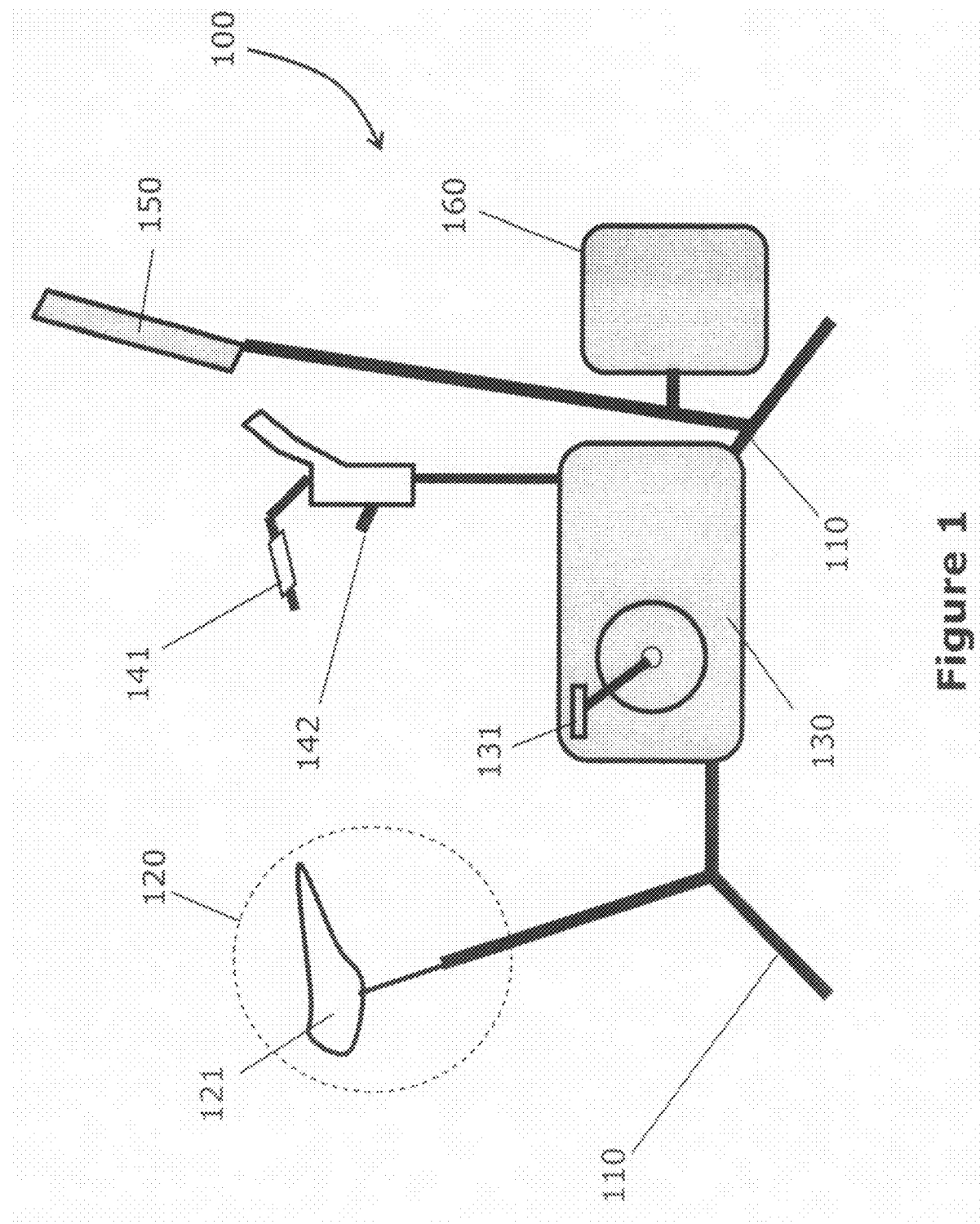

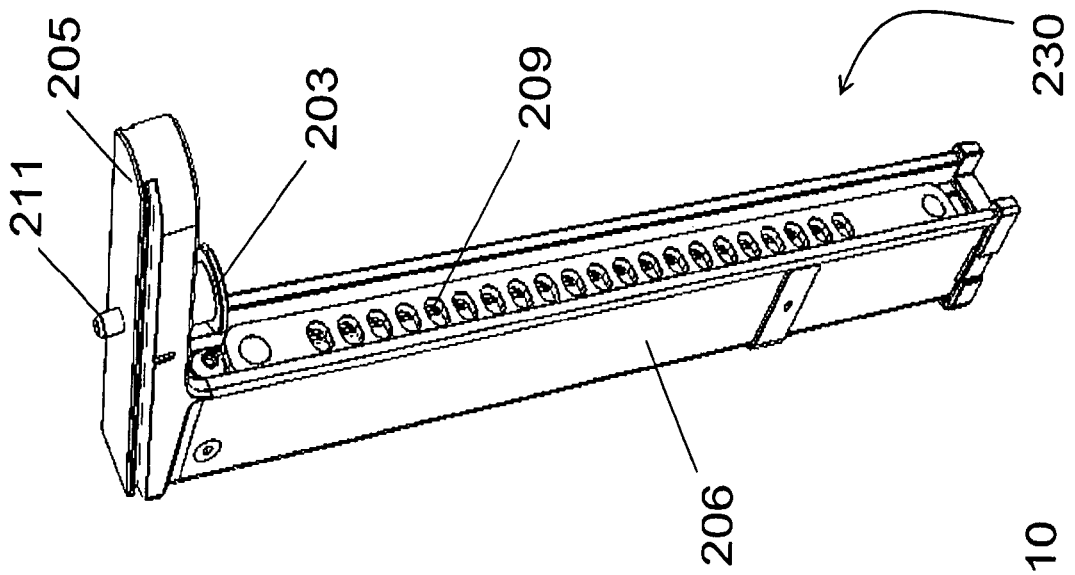
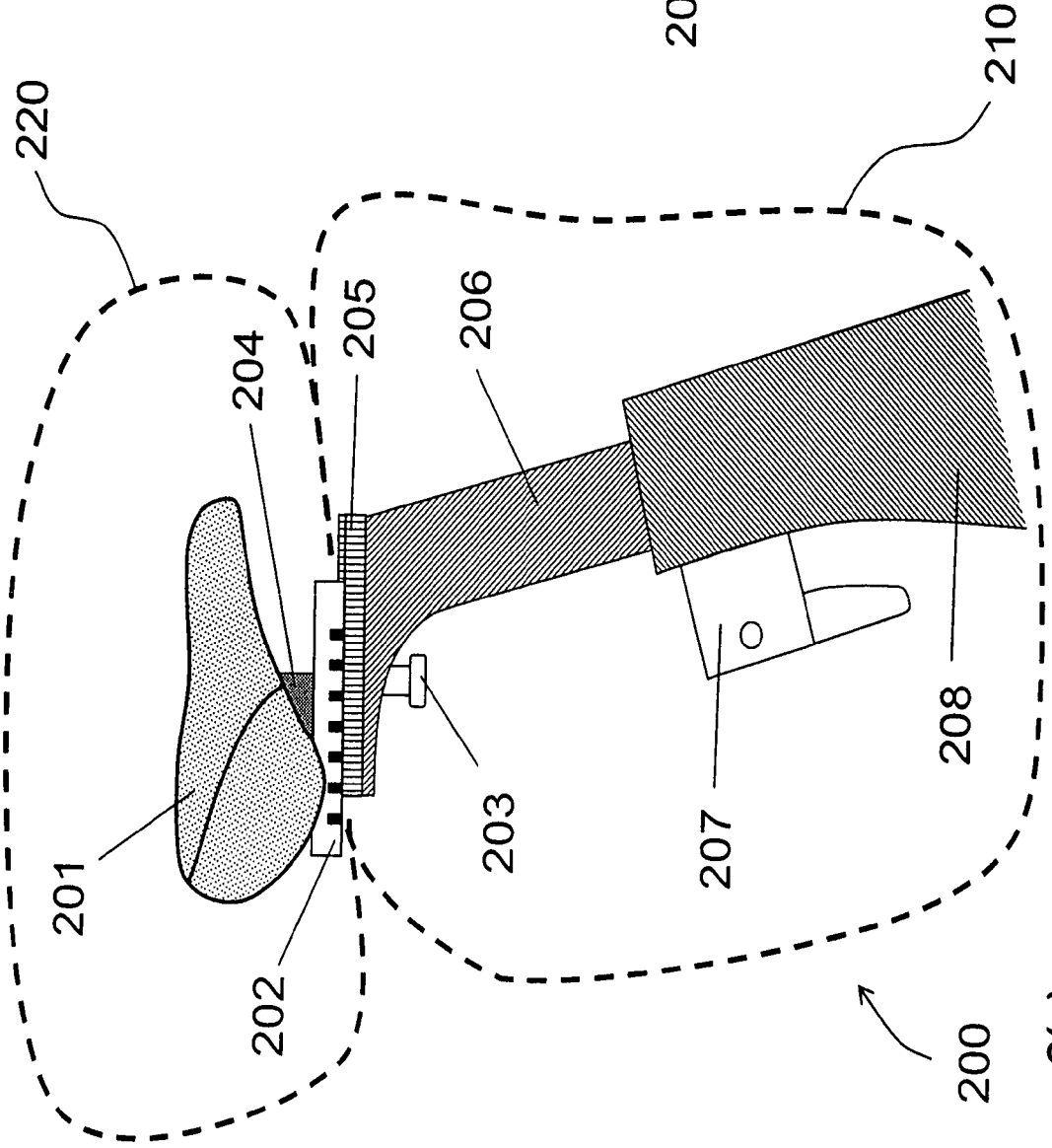
Figure 2(b)
Figure 2(a)

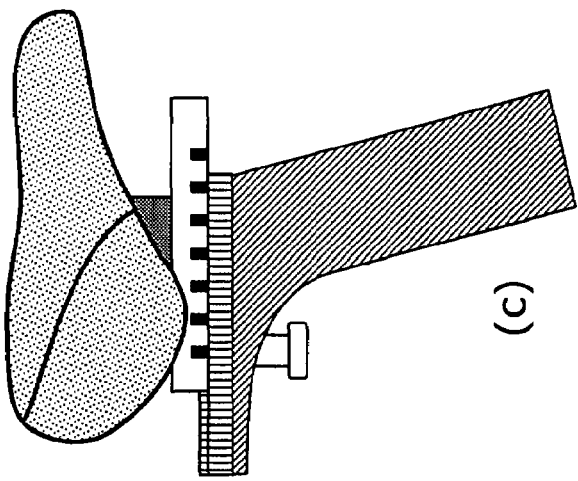
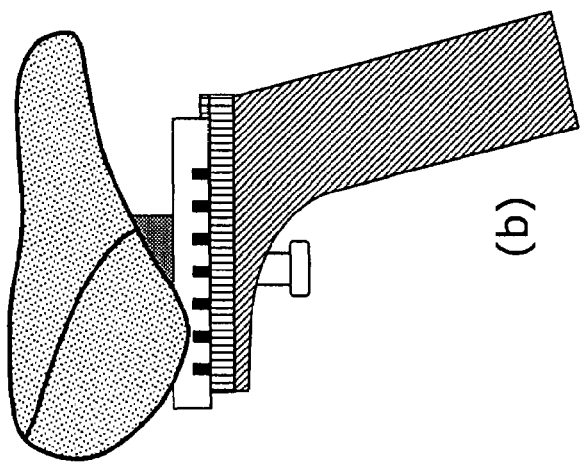
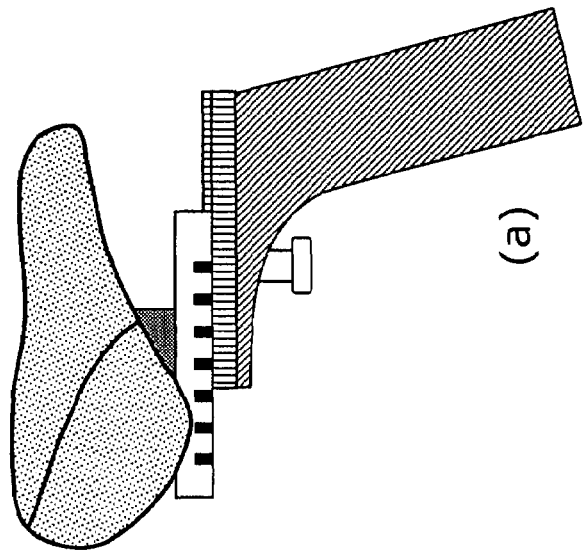
Figure 8

SEAT FOR CARDIO-FITNESS EQUIPMENT

RELATED APPLICATIONS

This application is related to and cross-references U.S. application Ser. No. 11/433,778, filed May 11, 2006, and entitled "Cardio-Fitness Station With Virtual-Reality Capability," by John Fisher et al., the contents of which application are hereby incorporated by reference.

BACKGROUND

1. Field of invention

This invention relates to stationary exercise equipment and seats used by such equipment. More specifically, the invention relates to seats used by cardio-fitness stations.

2. Background of the Invention

Stationary exercise equipment, which can be but are not limited to stationary exercise bicycles, are ubiquitous for in-house exercise and fitness clubs. Typically, a user (referred to as a rider) pedals to dissipate power and exercise his/her muscles on a stationary exercise equipment. There are two types of stationary exercise equipment—upright and recumbent, each having a seat on which the rider sits while exercising. The upright exercise equipment requires a rider to sit straight. The recumbent exercise equipment allows the rider to sit back, which is sometimes preferred by people with lower back pain or reduced mobility.

For posture and proper exercise reasons, seat position is one of the major characteristics that the rider considers when selecting a stationary exercise equipment. Stationary exercise equipment manufacturers typically opt for a wide and comfortable seat to satisfy the broadest population and regularly offer user-friendly seat height adjustment.

State of the art exercise equipment have many features found on their real world counterparts (such as road bicycles). Such features include but are not limited to, pedals with a varying degree of pedaling resistance, handlebars that turn, gear-shifting members, and bicycle-like seats. The exercise equipment may also have features that generally do not appear on their real world counterparts, such as heart-rate monitoring, video and sound entertainment. Cardio-fitness stations, the most advanced stationary exercise equipment to date, offer virtual reality capabilities that allow the rider to interact with a virtual environment shown on a video monitor and to experience a virtual ride through a predetermined landscape with hills, valleys, and road obstacles. Such feature has given rise to competition between riders exercising on two cardio-fitness stations, i.e., the riders can operate separate cardio-fitness stations to ride jointly in a race through the same predetermined virtual landscape.

Riders of such advanced exercise equipment with virtual reality capabilities, and of other stationary exercise equipment in general where the riders sit while exercising, tend to spend a lot of time on these equipment and may probably get sore muscles if the seats of the equipment are uncomfortable. In the case of a real world road bicycle (for a non-limiting example), the rider usually selects his/her preferred seat at the time of the purchase, does not share the seat with other users, and rarely has a need to replace the seat for any reason other than replacing a defective or a broken item. In addition, road bicycle offers adjustments of seat height as well as seat proximity to handlebars (in further text referred to as "seat proximity") so the rider can position him/herself properly. Here, the adjustment of seat proximity usually is quite difficult and is less common on recreational bicycles. In contrast, a stationary exercise equipment in a fitness club may have many riders, and thus may cause several problems. First, different riders have different preferences of the type, size, and position of the seat of the stationary exercise equipment, hence one seat type or limited seat position adjustment will not generally satisfy most riders. Second, with many riders using the same seat for prolonged times, the seat has to be cleaned often. Simple on-site cleaning has been the general approach to resolve this issue, but that may not be sufficient for at least some of the riders. These multi-rider issues are particularly pronounced in sophisticated exercise equipment such as the cardio-fitness stations, which are often the most popular choice in the fitness clubs.

There is an apparent need in the industry to provide a stationary exercise equipment in general, and a cardio-fitness station in particular, with the following features: (a) user-friendly adjustment of the seat position (both seat height and seat proximity), (b) exchange of the seat type to one that is more suitable for the rider, and (c) user-friendly seat removal.

SUMMARY OF INVENTION

One embodiment of the present invention discloses a cardio-fitness equipment with a seat that features height adjustment, proximity to handlebar adjustment, and easy removal of the seat for the purpose of exchange with a different user-selected model or for cleaning.

BRIEF DESCRIPTION OF THE DRAWINGS

FIG. 1 shows an exemplary cardio-fitness station in accordance with one embodiment of the present invention.

FIG. 2 shows an exemplary seat assembly of the cardio-fitness station in accordance with one embodiment of the present invention.

FIG. 8 shows an exemplary seat locked in three different seat proximity positions (a) far back, (b) center, (c) far forward in accordance with embodiments of the present invention.

DETAILED DESCRIPTION OF EMBODIMENTS OF THE INVENTION

Figure 3:
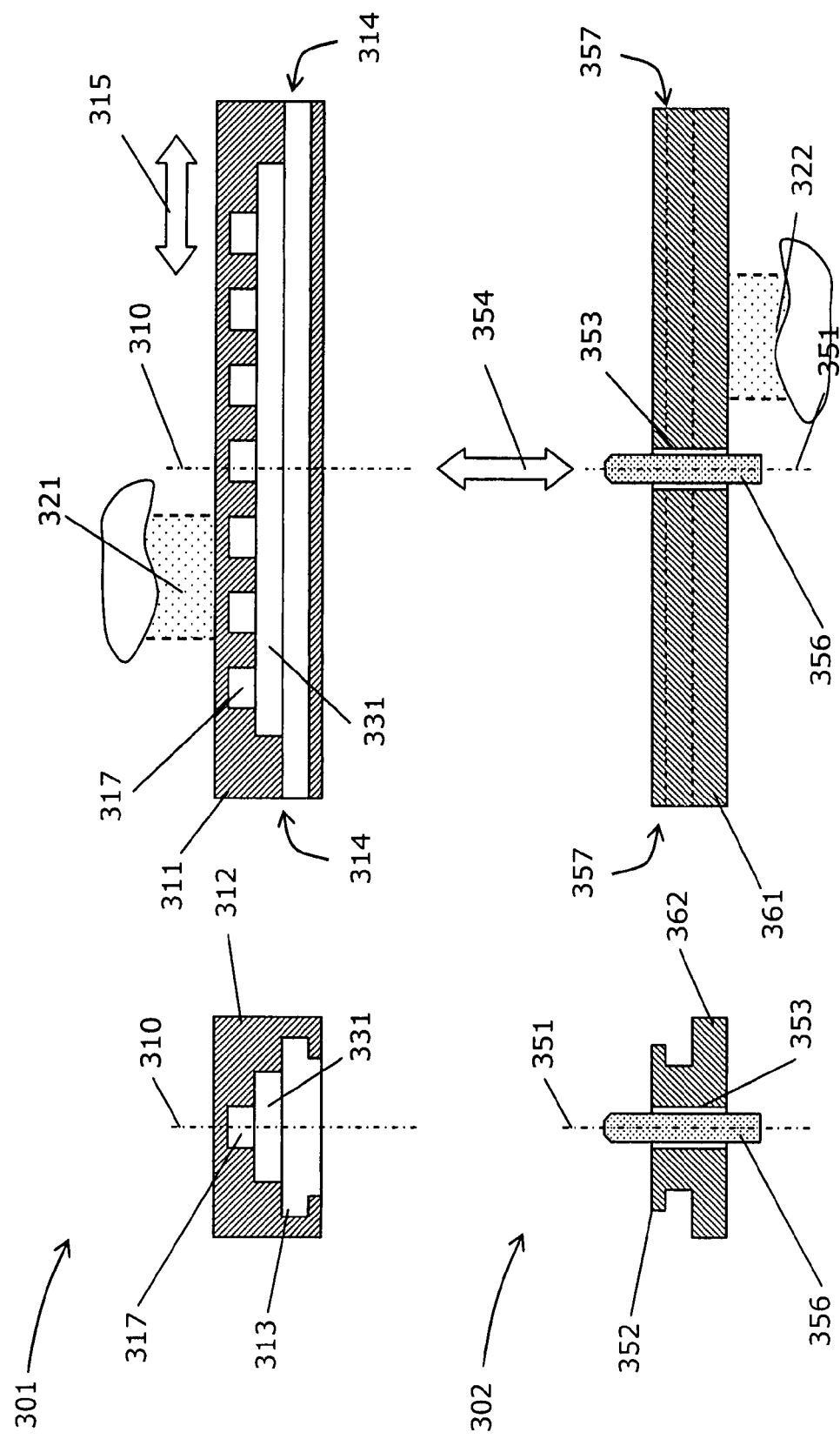
FIG. 3 shows an exemplary seat slider and slider track cross-sectional views of the cardio-fitness station in accordance with one embodiment of the present invention.

In the following description, several specific details of an exemplary cardio-fitness station are presented to provide a thorough understanding of embodiments of the invention.

One skilled in the relevant art will recognize, however, that the invention can be practiced with any stationary exercise equipment without one or more of the specific details, or in combination with other components, etc. In other instances, well-known implementations or operations are not shown or described in detail to avoid obscuring aspects of various embodiments of the invention.

An exemplary cardio-fitness station with virtual reality capability in accordance with one embodiment of the present invention is shown in FIG. 1. The cardio-fitness station 100 is modeled after a real outdoor bicycle, but contains elements of general stationary exercise equipment. The cardio-fitness station includes handlebars 141, gear-shifting lever 142, pedal assembly 130, seat assembly 120, a computer 160, and a video monitor 150, all mechanically connected or attached to a frame assembly 110.

The seat assembly 120 of the exemplary cardio-fitness station is further described with the help of FIG. 2. The seat assembly 200 comprises a seat cushion 201, and a seat slider 202 attached to the seat cushion via hardware 204. The seat slider 202 is in contact with the slider track 205 that allows the seat slider 202 to slide back and forth along the slider track 205 and be locked in any one of several positions using a pin (adjustment knob) 203, thereby allowing the rider to control the seat proximity, i.e., control of the distance from the seat to the handlebars. The slider track 205 is attached to a seat support rod 206, which is inserted into a seat frame support 208. The seat support rod 206 can slide up and down while inserted in the seat frame support 208. The seat frame support 208 is attached to or an extension of the frame assembly 110 previously shown in FIG. 1. A lever 207 can be loosened/tightened to adjust the height of the seat cushion 201 with respect to the seat frame support 208, thereby allowing the rider to control the seat height. It is clear that the embodiment disclosed in FIG. 2 may be implemented in any stationary exercise equipment without departing from the spirit of the invention.

Referring back to FIG. 1, the rider preparing to exercise may sit on a seat cushion 121 as one would on a real world bicycle and start pushing pedals 131 (only one shown in FIG. 1) while holding the handlebars 141. The video monitor 150 is positioned in the plain view of the rider while he/she is seating on the seat. The rider can watch the images on the video monitor 150, listen to sounds coming from headphones (not shown), and optionally speak into a microphone (not shown).

FIGS. 2, 3, 4, and 5 show different structure views of an exemplary seat assembly of the exemplary cardio-fitness station in accordance with one embodiment of the present invention. These figures are used to disclose the features of the invention, but it is clear that variations on the same embodiment and the implementation of equivalent ideas that perform the same function do not depart from the spirit of the invention. The inventive hardware concept is intended for use in conjunction with a cardio-fitness station with virtual reality capability, but may be applied to any regular stationary exercise equipment without departing from the spirit of the invention.

Figure 6:
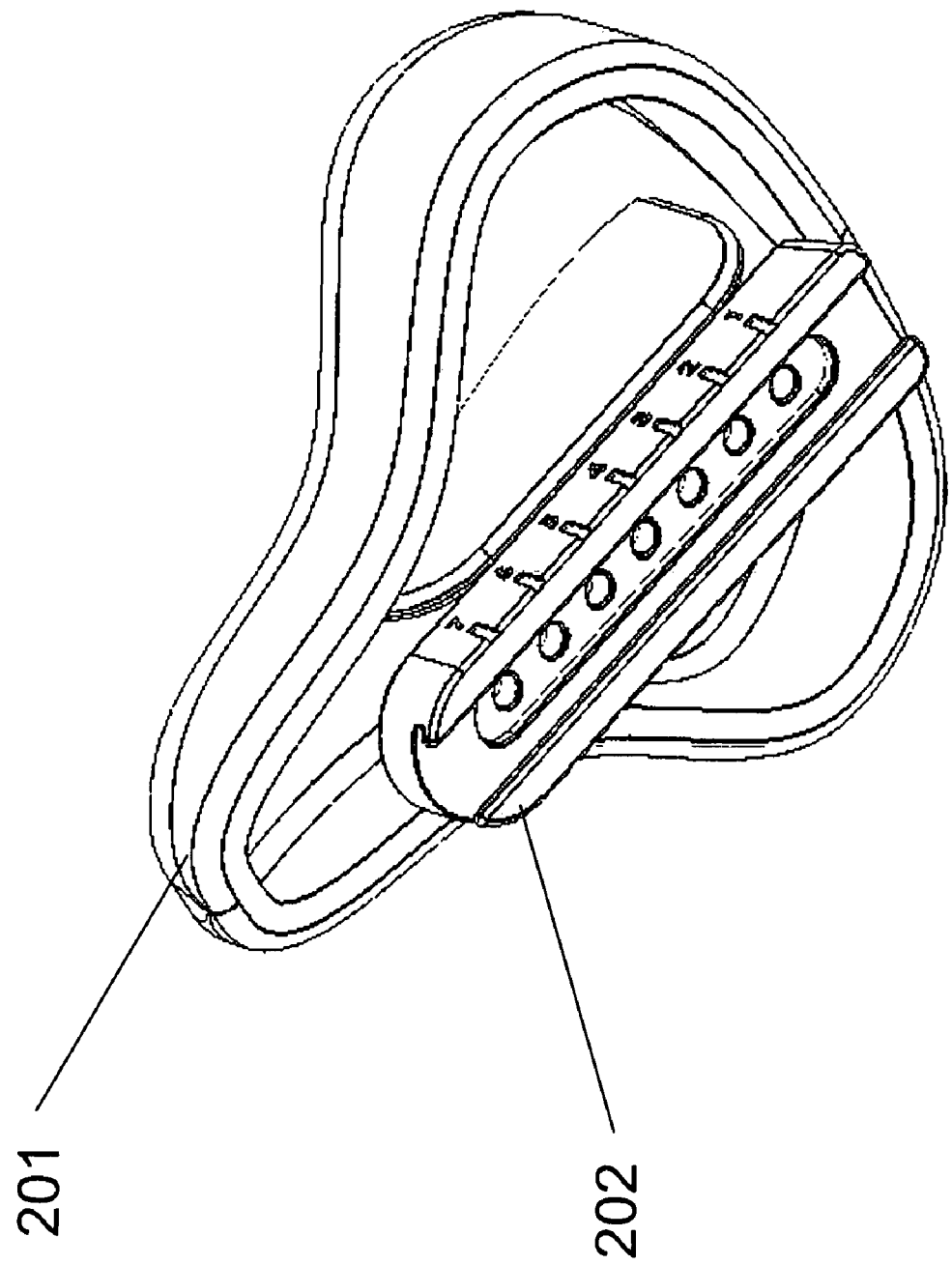
FIG. 6 shows a wire-frame mechanical drawing of an exemplary seat in accordance with one embodiment of the present invention. The drawing shows a seat as seen from the bottom where the seat slider is visible.
Figure 9:
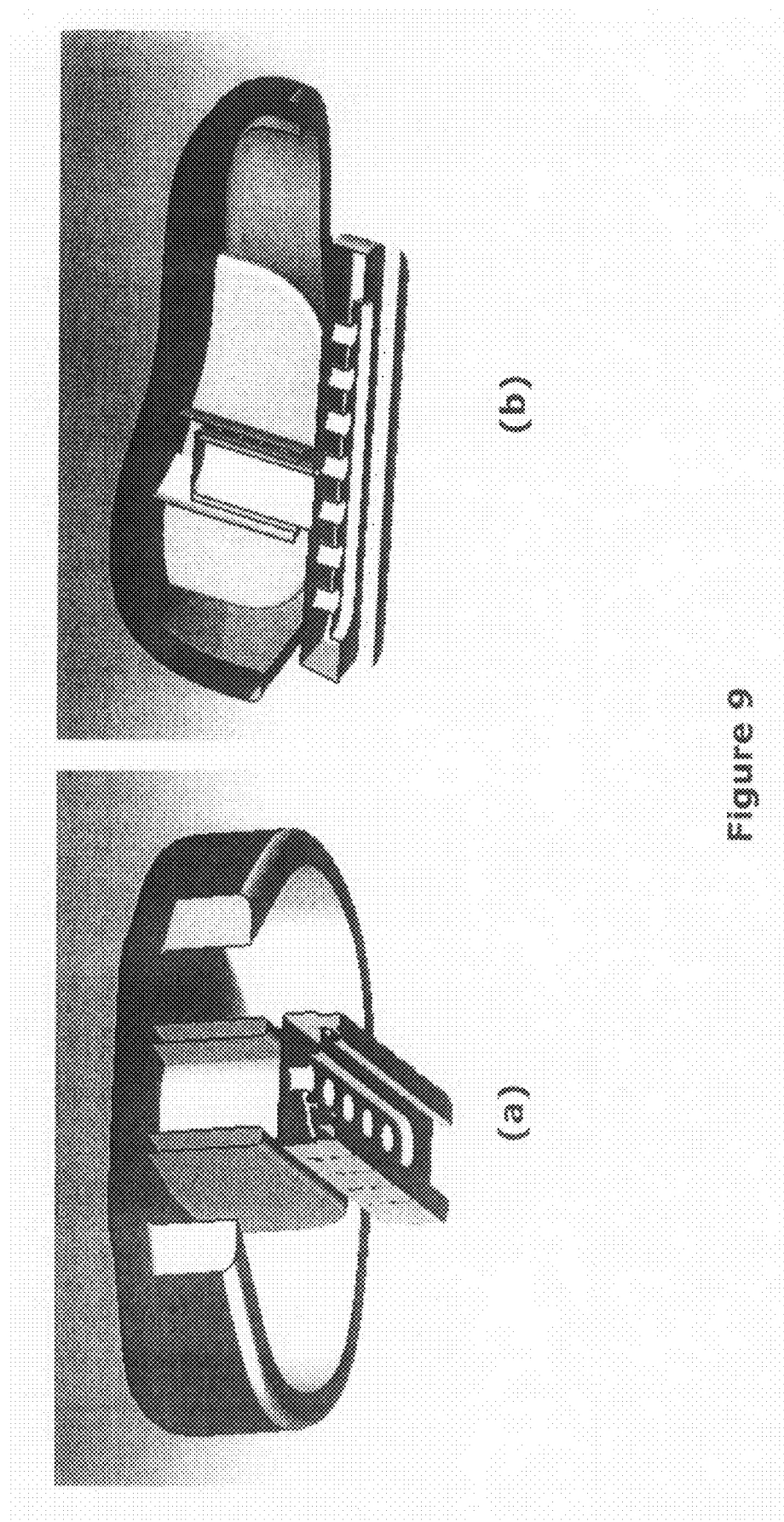
FIG. 9 shows a shaded mechanical drawing of an exemplary seat with two cross-sectional views accentuated: (a) lengthwise cross-sectional view and (b) sideways cross-sectional view in accordance with embodiments of the present invention.

Referring to FIG. 2, seat 220 comprises the seat cushion 201, the seat slider 202 and several other components, which include but are not limited to, springs and fastening hardware visible in FIG. 2 as 204 and in FIG. 6 showing the seat from below. The seat slider 202 and the seat cushion 201 are mechanically attached to each other via 204, which is present to attach the seat cushion 201, springs (not visible) and other seat hardware to the seat slider 202. This attachment may be engineered in more than one way without departing from the spirit of the invention and is generally known in the art of stationary exercise equipment manufacturing. Several more views of the seat are shown in FIG. 9. In FIG. 9, a wire-frame drawing of the seat is shown with the seat cushion 201 and the seat slider 202 visible. The details of the seat slider are described in later text.

In some embodiments, the seat support assembly 210 comprises a seat-support frame 208, which is a part of the frame 110 (in FIG. 1) on which the seat assembly 120 (FIG. 1) is located, the seat post 206, which is inserted into the seat-support frame 208, and the lever 207 for loosening/tightening the seat post 206 to the seat-support frame 208. In one embodiment, the seat height adjustment is realized using a height-adjusting locking pin (not shown) actuated via the lever 207, which allows the seat height to be locked in any number of discrete heights marked by a plurality of height-adjusting pin holes 209 (shown in FIG. 2(b)). In another embodiment, the height adjustment is accomplished by a mechanical assembly that exerts pressure and locks the seat post 206 to the seat-support frame 208, where the pressure may also be actuated via a lever similar to 207 or a threaded bolt (not shown).

In some embodiments, the seat adjustment knob 203 can be used by the rider to adjust seat proximity and/or exchange the seat. FIG. 2(b) shows a mechanical wire-drawing of the seat support assembly 230, which includes the slider track 205, the seat support rod 206, the height-adjusting lock holes 209, and the seat lock knob 203, which controls the protrusion of a locking pin 211.

In some embodiments, the seat 220 and the seat-support assembly 210 are mechanically attached to each other and move relative to each other while in contact. In an exemplary operation, the two parts are in contact with each other with the seat slider 202 engaged with the slider track 205 as shown in FIG. 2(a). This movable engagement between the seat slider 202 and the slider track 205 enables the rider to adjust the position of the seat relative to the handlebars or to completely remove the seat 220 from the seat-supporting frame 208. The movement of the seat slider 202 is enabled with the locking knob 203 pulled down, which allows the seat slider 202 to move on top of the slider track 205 along the lengthwise direction. These features are described below in more details.

The mechanism for adjusting and exchanging the seat 220 from the seat-supporting assembly 210 is disclosed with the help of FIG. 3. Seat slider 301 (202 in FIG. 2) and slider track 302 (205 in FIG. 2) are shown with two cross-sectional views each, wherein lines 310 and 351 are used to orient the seat slider 301 and slider track 302 respectively in space and to provide the location of the cross-sectional views relative to the seat slider 301 and slider track 302. Lines 310 and 351 are each substantially perpendicular to the lengthwise direction of the two parts and substantially perpendicular to the floor on which the stationary exercise equipment is located, but employing this invention at and angle with respect to the floor does not depart from the spirit of the invention. Lengthwise direction means direction pointing from the seat to the stationary exercise equipment's handlebars. It is also the direction that is parallel to the longer dimension of the seat slider 202 shown in FIG. 2. When in normal operation (with the seat slider 301 engaged with the seat frame track 302), the seat slider 301 and the slider track 302 are so oriented relative to each other that lines 310 and 351 are parallel to each other.

The cross-sectional view of the seat slider lengthwise through line 310 is shown as 311. The exemplary lengthwise cross-sectional view is also illustrated on the mechanical drawing in FIG. 9(b) and explained with the help of FIG. 3. The sideways cross-section at the location of the line 310 is shown as 312. The cross-sectional view of the slider track 302 lengthwise though line 351 is shown as 361, while the sideways cross-section at the location of line 351 is shown as 362. The sideways cross-sectional view is also illustrated in the mechanical drawing in FIG. 9(a) and explained with the help of FIG. 3. The seat slider 301 is attached to the seat cushion (not shown in FIG. 3, but shown in FIG. 2(a)) using the hardware mentioned in the description of FIG. 2(a). The presence of this attachment is illustrated with the shaded area 321. Furthermore, the slider track 302 is attached to the seat-supporting frame and the presence of this hardware is illustrated with the shaded area 322.

In some embodiments, the seat slider 301 features a lengthwise track cavity 313 that is open on at least one end 314 of the seat slider 301 (FIG. 3 shows an embodiment in which both ends are open). The slider track 302 features two edge-tracks 352 extending lengthwise along the slider track 302. The edge-tracks 352 fits into the lengthwise track cavity 313 of the seat slider 301 when inserted from at least one end of the seat slider. The slider track 302 maintains the cross-section view 362 on at least one end 357 of the slider track, allowing the insertion of the seat slider from that end. The tracks 352 and the track cavity 313 are dimensioned in such a way to facilitate smooth uninhibited sliding motion of the seat slider 301 with respect to the slider track 302. In one embodiment, the seat slider 301 and/or slider track 302 can be made of metal, such as steel.

In some embodiments, the seat slider 301 further features an adjustment cavity 331 which stretches lengthwise, but is closed on both ends before reaching either end of the seat slider 301. The seat slider 301 further features at least one locking hole 317, which is open at least towards the adjustment cavity 331.

In some embodiments, the slider track 302 features a locking pin 356, which can be moved parallel to line 351 in the direction marked by arrow 354. The locking pin 356 fits and slides within the locking-pin channel 353. The assembly which holds the pin in place will be described in later text. The dimensions of the locking pin 356 are determined under the requirements that the tip of the locking pin 356 can fit into the locking pin holes 317 and the tip of the pin 356 protruding from the top surface of the slider track 302 can allow the tip of the locking pin 356 to reach the top of any locking pin hole 317. In one embodiment, the seat slider 301 and the slider track 302 can be engaged and held in place relative to each other via the locking pin 356, which allows the seat proximity to be adjusted at an integer number of discrete positions.

Figure 5:
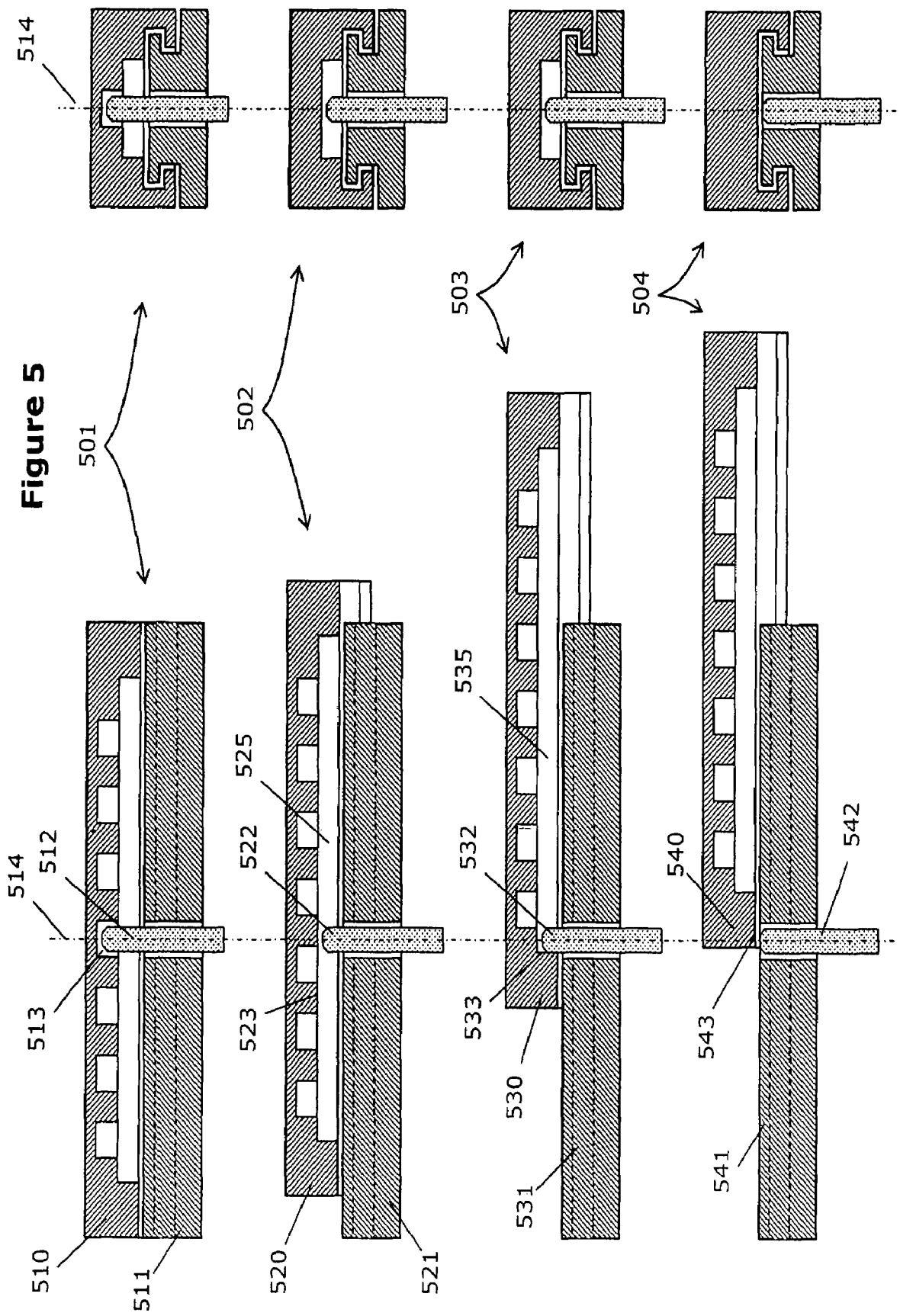
FIG. 5 shows an exemplary seat slider and slider track cross-sectional views for different configurations in accordance with one embodiment of the present invention.

FIG. 5 describes exemplary configurations that enable seat locking, seat adjustment, and seat exchange. Configuration 501 shows the seat slider 510 (same slider as 301 in FIG. 3) engaged with the slider track 511 (same slider track as 302 in FIG. 3) with the locking pin 512 in its top position, wherein the tip of the locking pin 512 is located within one of the holes 513. As noted previously, in the absence of the locking pin 512, the seat slider is able to slide along the lengthwise direction freely. However, when the locking pin 512 is moved to its highest position where it enters the hole 513 (shown in configuration 501), it locks the seat slider 510 and prevents any relative motion with respect to the slider track 511. This is the stationary equipment's normal operation position, also referred to as the seat locking position. The side-view 501 also shows the cross-section through line 514, which is made to coincide with the symmetry axis of the locking pin 512.

In configuration 502, locking pin 522 is pulled down so the tip of the locking pin 522 is no longer within any of the holes of the seat slider 520 and the locking pin 522 is just low enough to let the seat slider 520 to move lengthwise. The tip of the locking pin 522 clears section 523 between the holes, but remains within adjusting cavity 525. In this configuration, referred to as the adjusting configuration, the seat slider 520 can move forwards and backwards and a new location may be found for which the locking pin tip can be moved up into another hole to lock the seat slider at the new location. The exemplary view in FIG. 5 shows seven holes 513 in the seat slider 510. In one embodiment shown in FIG. 5, the design enables seven discrete positions of the seat slider 520 relative to the locking pin 522, i.e., the seat of this stationary equipment has seven fixed distances to the handlebar that the rider can choose from.

While in the adjusting configuration, the seat slider 520 can be pushed to its farthest possible location, illustrated with view 503, in which the tip of the locking pin 532, still within the adjusting cavity 535, hits against end 533 of the adjusting cavity 535. The adjusting cavity 535 is closed with such end on both sides and hence prevents the seat slider 530 from being removed from the slider track 531 as long as the locking pin tip height is such that the locking pin tip remains within the adjusting cavity 535. The configuration 503 is also referred to as the adjusting configuration.

Finally in configuration 504, locking pin 542 is moved down so that the tip of the locking pin 542 clears bottom 543 of the of adjusting cavity to allow seat slider 540 move past the locking pin 542 and be removed all together from slider track 541. The slider track 541 and the seat slider 540 are open on at least one end to allow this complete removal. In one embodiment (illustrated in 504), the seat slider 540 can be removed from either end. In another embodiment, the seat slider 540 can be removed only from one end. The configuration 504 is referred to as the seat exchange configuration, which allows the rider of the stationary exercise equipment to move the locking pin to its bottom-most position and remove the seat from the stationary exercise equipment, or exchange the seat with a new seat.

In some embodiments, the insertion of a new seat (seat replacement or seat exchange) requires the rider to pull the locking pin to its bottom-most position and engage the seat slider of the new seat with the track. Once the end of the adjusting channel clears the pin locations (situation as in 502), the pin can be released to lock the new seat in place (situation as in 501). FIG. 8 shows an exemplary seat assembly in three different seat-proximity positions: (a) far back, (b) center, and (c) far forward. The details of the seat assemblies in FIG. 8 are given in FIG. 2.

Figure 4:
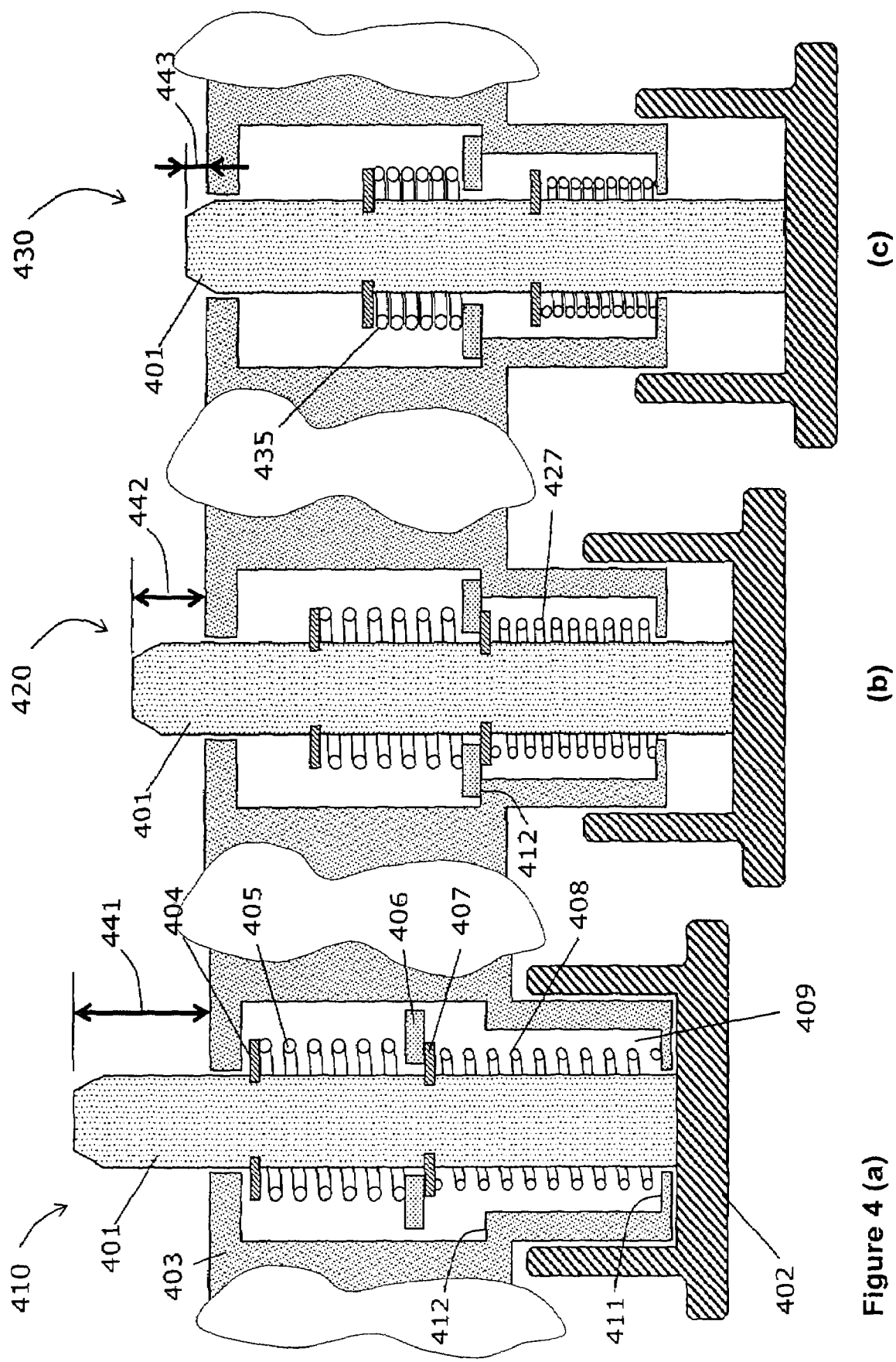
FIG. 4 shows an exemplary seat locking mechanism in three configurations: (a) seat locked (normal operation), (b) seat adjustment, and (c) seat exchange configurations in accordance with embodiments of the present invention.

One embodiment of the mechanism determining the motion and handling of the locking pin is illustrated with the help of FIG. 4. FIG. 4 shows the operation of an exemplary two-step lock for the seat slider in three configurations 410, 420, and 430, shown in FIGS. 4(a)-(c), respectively, wherein configuration 410 is the "seat locking" configuration, configuration 420 is the "seat adjusting" configuration, and configuration 430 is the "seat exchange" configuration. All three configurations shown in FIGS. 4(a), 4(b) and 4(c) contain same parts, but in different relative arrangements.

A section of the slider track (302 in FIG. 3) is shown as 403, which comprises a cavity 409 containing two springs 405 and 408, at least three rings denoted as 404, 406, and 407, and a locking pin 401. The locking pin 401 protrudes out of the top and the bottom of the cavity 409. At the bottom, the locking pin 401 is attached to the lock knob 402, while the other side of the locking pin 401 protrudes from the top of the slider track 403 by a distance denoted by 441. The protruding distance can be different depending on the configuration. In the seat locking configuration 410, the locking pin 401 protrudes by the largest amount (shown with 441). In this configuration, the seat slider (not shown) is locked and cannot be moved. In the seat adjusting configuration 420, the locking pin 401 protrudes by an intermediate distance 442. In this configuration, the seat slider (530 in FIG. 5) can move forward and backward until the seat slider reaches either end (533 in FIG. 5) of the seat slider 530. In the exchange configuration 430, the pin protrudes by the smallest distance 443. In one embodiment of the exchange configuration 430, the locking pin 401 does not protrude at all, but is rather pulled below the surface of the slider track 403. In the exchange configuration 430, the locking pin protrusion 443 can be sufficiently low so that the tip of the pin 401 clears the seat slider bottom (523 in FIG. 5) and allows the seat slider to be removed from the slider track 403. It is clear that there can be a continuum of positions in between these three configurations and that the seat locking, seat adjusting, and seat exchange (or removal) configurations may be defined approximately by the resulting function. As it will be seen in the description below, the exact position of the pin may vary due to manufacturing and piece-part tolerances.

In some embodiments, configuration 410 is the resting configuration in which the seat (when present) is locked in position. The rings 404, 406, and 407, together with the bottom 411 of cavity 409, limit the motion and the position of the two springs 405 and 408. The top spring 405 winds around the locking pin 401 and the axial motion of the locking pin is constrained by ring 404 and ring 406. The ring 404 is attached to the locking pin 401 so that it does not allow the spring 405 to move up beyond the level determined by the ring 404. The ring 406 is not attached to the locking pin 401 but rests on the ring 407. The bottom spring 408 winds around the locking pin 401 and the axial motion of the locking pin is constrained by ring 407 and bottom 411 of the cavity 409. The ring 407 is attached to the locking pin 401 so that it does not allow the spring 408 to move up beyond the level determined by the ring 407.

In some embodiments, the movement of the lock knob 402 exhibits two spring constants, where a spring constant is the proportionality factor between the force required to compress (or pull apart) a spring and the amount of spring deflection (amount of compression or extension) in response to change in the spring length. Starting from the locking configuration 410, a rider pulling the knob 402 downwards (away from the slider track 403) experiences a resisting force according to a first spring constant (compression of the bottom spring 408) until the ring 406 is stopped by the step 412 in the cavity 409. This configuration is illustrated in FIG. 4(b) and referred to as the adjusting configuration. The bottom spring 408 can be compressed, as shown with 427, when the relative distance between the ring 407 and the bottom 411 of the cavity 409 is reduced. In configuration 420, the ring 406 touches step 412 in the cavity and from that point on, the rider pulling on the knob further experiences a second spring constant which is due to the combined effects of the bottom spring 408 and the top spring 405. The step 412 prevents the ring 406 from moving downwards with the pin 401 and causes the compression of the top spring 405. When the first of the two springs (405 or 407 or both) is completely compressed, the pin cannot move further down and the locking assembly is in the seat exchange configuration 430. The force experienced by the rider under this configuration can be written as $$F = \begin{cases} k_B y & 0 \le y \le y_{ADJ} \\ k_B y + k_T (y - y_A) & y_{ADJ} < y \le y_{EX} \end{cases}$$

where y is deflection 433 from the topmost position of the locking pin 401, i.e., the locking position (always positive), $y_{ADJ}$ is the deflection for which the top spring 405 starts compressing, $y_{EX}$ is the maximum deflection of the pin 401, and $k_B$ and $k_T$ are the spring constants of the bottom spring 408 and the top spring 405, respectively. It is clear that the second spring constant, which is a combination of the two springs, is larger than the first spring constant, and the seat slider can be adjusted for deflection with $y_{ADJ} < Y \le y_{EX}$. The two spring constants can be adjusted so that the rider can easily detect a difference in the spring constant and hence feel the change in the resistance to gauge his or her intent accordingly to either adjust the seat or to completely remove the seat.

In some embodiments, the mechanical assembly of the locking pin has the functions one or more of (a) locking the slider in place (configuration 501), (b) unlocking the slider to allow slider movement, but not removal (configuration 502 and 503), and (c) moving out of the way when the slider is to be removed. In one embodiment, the seat proximity can be locked in a number of discrete positions. It will be evident to a person skilled in the art that these tasks may be realized using any number of different mechanical approaches known in the art and at different places on the slider and the slider track without departing from the spirit of the invention. For a non-limiting example, the locking pin may be inserted from the slider towards the slider track rather than from the slider track toward the slider.

Figure 7:
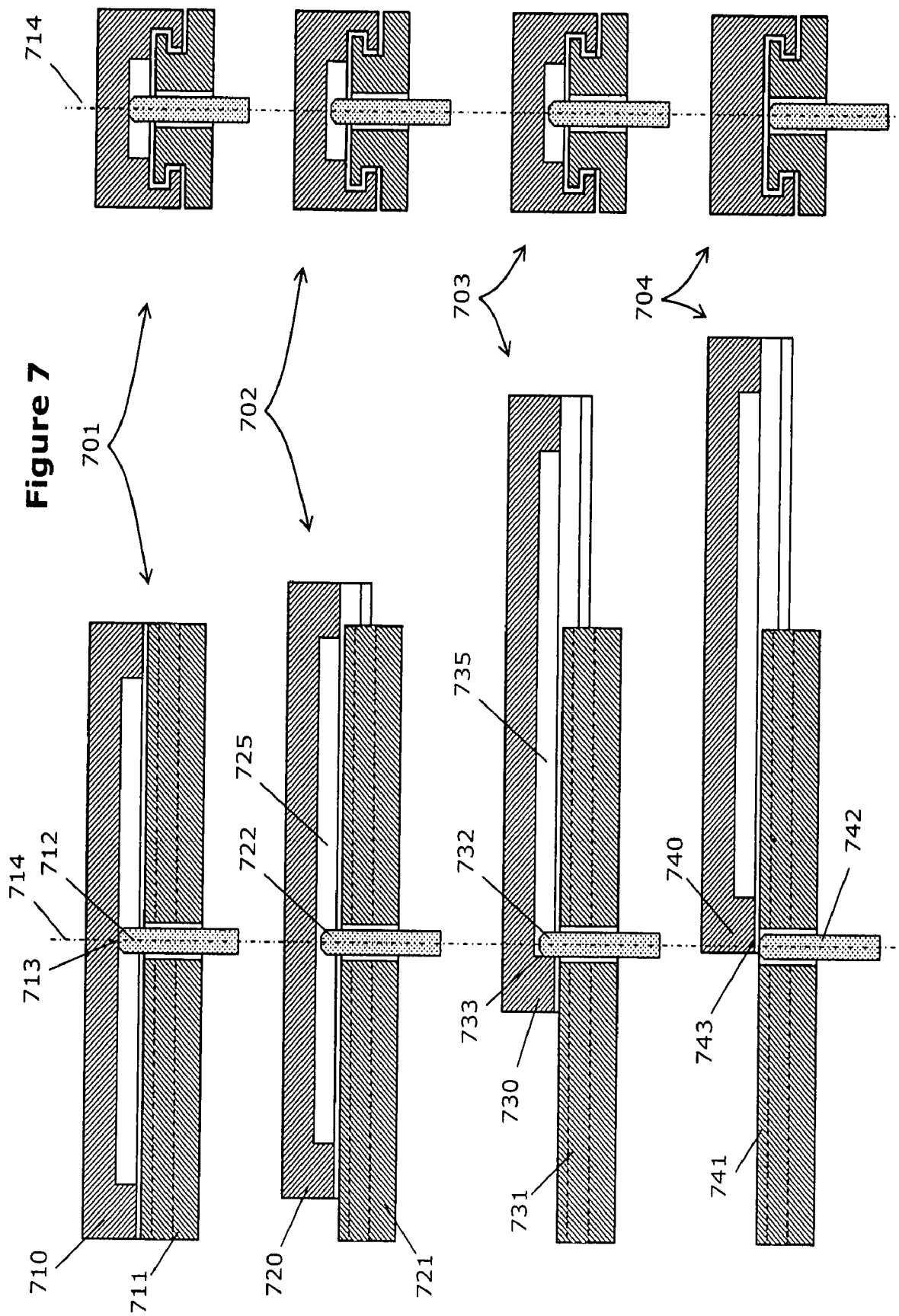
FIG. 7 shows an exemplary seat slider and slider track cross-sectional views for different configurations in accordance with one embodiment of the present invention.

In an alternate embodiment of present invention, described with the help of FIG. 7, the seat proximity adjustment mechanism features a friction-based locking system, wherein the seat slider is locked to the slider track by means of friction. The friction may be resulted from pressure exerted by a pressure pin and a mechanical lever (or bolt handle) accessible to the rider. FIG. 7 shows cross-sectional views of different configurations of this alternate embodiment of the present invention through the seat slider and the slider track at the location of line 714, which passes through the center of the pressure pin. This alternate embodiment allows continuously variable proximity position adjustment.

The configuration 701 shows the slider track 711 with a pressure pin 712 and a seat slider 710 positioned in normal operation (seat locked) position. The pressure pin 712 is pressed against the seat slider 710 so that the friction at surface 713 where the pressure pin 712 and the seat slider 710 meet exhibits friction and prevents the seat slider 710 from moving.

In configuration 702, the pressure pin 722 pressuring towards the seat slider 720 has been released and the seat slider 720 can consequently move lengthwise along the slider track 721 to the full length of the adjusting cavity 725. In this configuration, the seat slider 720 is allowed to move freely lengthwise and the rider can lock the seat slider 720 by reapplying the pressure to the pressure pin 722 in any location along the seat slider 720, thereby adjusting the seat proximity to his or her comfort. In the configuration 702, the seat is allowed to move, but it can not be removed from the slider track 721. Configuration 703 shows the case when the seat slider 730 has been moved all the way to the end when the pressure pin 732 hits the end of the adjusting cavity 735.

In configuration 704, the pressure pin 742 has been moved down farther so that it clears the end 743 of the seat slider 740. In this configuration, the slider 740 can be completely removed from the slider track 741 and thereby allows the rider to remove the seat for cleaning and/or insert a new seat.

In some embodiments, the pressure pin 742 has to remain in the same low position as shown in configuration 704 so it clears the end 743 of the seat slider 740 where the new seat is about to be inserted. Once the new seat (or the original seat) is inserted, i.e., the seat slider brought back onto the slider track, the pressure pin 742 should be brought back to either its adjusting position shown in configuration 702 or to its locking position as indicated in configuration 701.

In some embodiments, the mechanical assembly of the pressure pin has the functions of (a) providing pressure to the seat slider (configuration 701), (b) releasing pressure to allow seat slider movement (configuration 702), and (c) moving out of the way when the seat slider is to be removed. The mechanical assembly of the pressure pin of this alternate embodiment includes means for exerting and releasing pressure that is simple to use manually. In one embodiment, the pressure is exerted by a threaded pressure pin and the rider desiring to release the pressure can rotate the pressure pin by holding onto a handle. In another embodiment, the pressure pin is pressed using a clamp that magnifies the rider's hand force to lock the clamp in place.

In some embodiments, the seat adjustment and exchange can be accomplished via two separate locking pins connected to two separate knobs—the seat proximity adjustment knob and seat exchange knob. In another embodiment, the seat adjusting and exchange can be accomplished using two separate pressure pins connected to two separate knobs—the seat proximity adjustment knob and the seat exchange knob. In another embodiment, the seat adjusting and exchange can be accomplished via one pressure pin and one locking pin connected to two separate knobs—the seat proximity adjustment knob and the seat exchange knob.

It is clear that the force and the locking of the seat slider in place relative to the slider track may be realized using any number of different mechanical approaches known to one with ordinary skill in the art and at different places on the seat slider and the slider track without departing from the spirit of the invention. For a non-limiting example, the pressure may be exerted from the seat slider to the slider track rather than from the slider track toward the seat slider, and the pressure may be exerted using a clamp surface rather than a pin.

The present invention enables simple and user-friendly adjustment and exchange of seats of stationary exercise equipment. A variety of seat and cushion designs can be used on the same stationary exercise equipment equipped with the present invention

We claim:

1. An apparatus for seat adjustment, comprising:
a sliding member having a cavity formed within;
a track member;
wherein a portion of the track member formed to be suitable for fitting in the cavity of the sliding member and the sliding member being operable for sliding motion relative to the track member with the portion of the track member disposed within;
a locking pin disposed in a channel formed within the track member;
wherein, the locking pin is movable in the channel to a first position such that the locking pin is in contact with the sliding member to secure the sliding member to the track member;
a first ring attached to the locking pin to prevent the locking pin from moving beyond the first position in the channel;
a first spring wound around the locking pin; wherein, the first spring is attached to the first ring;
a second ring attached to the locking pin, wherein, the second ring is disposed near a center portion of the locking pin;
a second spring wound around the locking pin; wherein, the second spring is attached to the second ring;
a third ring that rests on the second ring when the locking pin is in the first position;
wherein, the locking pin is movable in the channel to a second position; wherein, in the second position, the sliding member is movable relative to the track member;
wherein, the locking pin is movable in the channel to a third position; wherein, in the third position, the sliding member is detachable from the tracking member to remove an attached seat from a frame attached to a seat support assembly.

2. The apparatus of claim 1,
further comprising, an adjustment knob coupled to the locking pin operable to adjust the position of the locking pin in the channel;
wherein, the adjustment knob is coupled to the locking pin at an end opposite to a tip portion of the locking pin.

3. The apparatus of claim 1,
wherein, the cavity includes a portion that is open on at least one end of the sliding member; and
wherein, the seat is inserted and removed from the frame at the at least one end.

4. The apparatus of claim 1, wherein, the sliding member includes an adjustment cavity that is closed on both ends.

5. The apparatus of claim 1,
wherein, the sliding member is movable via sliding motion relative to the tracking member among a set of discrete locations to adjust a position of the attached seat;
wherein, the sliding member is secure-able to the tracking member at one or more of the set of discrete locations when the locking pin is in the first position in the channel.

6. The apparatus of claim 5, wherein, the set of discrete locations is defined by a corresponding set of holes formed in the sliding member within which a tip portion of the locking pin is disposed when in the first position in the channel.

7. The apparatus of claim 1,
wherein, the sliding member is movable relative to the tracking member via sliding motion among continuous locations to adjust a position of the attached seat;
wherein, the sliding member is secure-able to the tracking member at one or more of the continuous locations when the locking pin is in the first position in the channel.

8. An exercise equipment, comprising:
a frame;
a seat support assembly mounted on the frame;
a seat;
a sliding member attached to the seat, the sliding member having a cavity formed within;
a track member attached to the seat support assembly, the track member having a channel formed within;
wherein, a portion of the track member is formed to fit in the cavity of the sliding member;
wherein, the sliding member is movably engaged with the track member for sliding motion relative to the track member;
a locking pin disposed in the channel formed within the track member;
a first ring attached to the locking pin to prevent the locking pin from moving beyond a first position in the channel;
a first spring wound around the locking pin; wherein, the first spring is attached to the first ring;
a second ring attached to the locking pin, wherein, the second ring is disposed new a center portion of the locking pin;
a second spring wound around the locking pin; wherein, the second spring is attached to the second ring;

a third ring that rests on the second ring when the locking pin is in the first position;

wherein, the first and second springs have different spring constants wherein, the seat is coupled to the seat support assembly via the sliding member and the track member;

wherein, the locking pin is adjustable in position in the channel and when moved to the first position in the channel, the locking pin is in contact with the sliding member and secures the sliding member to the track member;

wherein, when the locking pin is moved to a second position, the sliding member is removable from the track member to remove the seat from the frame.

9. The exercise equipment of claim 8, wherein, the locking pin is movable in the channel to a third position;

wherein, in the third position, the sliding member is movable via sliding motion relative to the track member.

10. The exercise equipment of claim 8, further comprising:

a pedal assembly;

a computer coupled to a video monitor;

a gear-shifting lever;

wherein, the computer is able to execute a computer program that causes the computer to simulate a virtual environment for display on the video monitor of the exercise equipment.

11. The exercise equipment of claim 8, further comprising, a set of handlebars attached to the frame;

wherein, the sliding member is movable via sliding motion relative to the tracking member among a set of discrete locations to adjust a position of the seat relative to the set of handlebars;

wherein, the sliding member is secure-able to the tracking member at one or more of the set of discrete locations when the locking pin is in the first position in the channel.

12. The exercise equipment of claim 11, wherein, the set of discrete locations is defined by a corresponding set of holes formed in the sliding member within which a tip portion of the locking pin is disposed when in the first position in the channel.

13. The exercise equipment of claim 12, further comprising, an adjustment knob coupled to the locking pin operable to adjust the position of the locking pin in the channel;

wherein, the adjustment knob is coupled to the locking pin at an end opposite to the tip portion of the locking pin.

14. The exercise equipment of claim 8, wherein, the cavity includes a portion that is open on at least one end of the sliding member; and wherein, the seat is inserted and removed from the frame at the at least one end.

15. The exercise equipment of claim 8, wherein, the cavity includes an adjustment cavity tat is closed on both ends of the sliding member.

16. The exercise equipment of claim 8, further comprising, a set of handlebars attached to the frame;

wherein, the sliding member is movable relative to the tracking member via sliding motion among continuous locations to adjust a position of the seat relative to the set of handlebars.

17. The exercise equipment of claim 16, wherein, the sliding member is secure-able to the tracking member at one or more of the continuous locations when the locking pin is in the first position in the channel.

18. The exercise equipment of claim 16, wherein, the sliding member is secured to the tracking member via friction force between the locking pin and the sliding member.

19. The exercise equipment of claim 8, further comprising, a plurality of height-adjusting pin holes formed in a seat post of the seat support assembly.

20. The exercise equipment of claim 19, further comprising, another locking pin to secure the seat post to the seat support assembly at one or more positions defined by the plurality of height-adjusting pin holes; and a lever coupled to the another locking pin;

wherein, the lever is movable to secure the seat post to the seat support frame or to loosen the seat post from the seat support frame.

* * * * *